US005787248A

United States Patent [19]

Zupcsics et al.

[11] Patent Number: 5,787,248

[45] Date of Patent: Jul. 28, 1998

[54] SYSTEM FOR SELECTING NETWORK MANAGEMENT PROTOCOL BY SETTING PROTOCOL HANDLER INDEX BASED ON NEWLY SELECTED PROTOCOL AND SELECTING PROTOCOL HANDLER ADDRESS USING PROTOCOL HANDLER INDEX

[75] Inventors: Gregg D. Zupcsics, Plantation; William Shaw, Pembroke Pines, both of Fla.

[73] Assignee: Racal-Datacom, Inc., Sunrise, Fla.

[21] Appl. No.: 581,919

[22] Filed: Jan. 2, 1996

[51] Int. Cl.[6] .......... G06F 13/14

[52] U.S. Cl. .......... 395/200.6; 395/200.53

[58] Field of Search .......... 379/242; 395/114, 395/200.52, 500, 357, 200.6, 200.53; 178/3

[56] References Cited

U.S. PATENT DOCUMENTS

| | | | |
|---|---|---|---|
| 4,156,796 | 5/1979 | O'Neal et al. | 178/3 |
| 5,265,239 | 11/1993 | Ardolino | 395/500 |
| 5,295,244 | 3/1994 | Dev et al. | 395/357 |
| 5,359,709 | 10/1994 | Blanc et al. | |
| 5,371,837 | 12/1994 | Kimber et al. | 395/114 |
| 5,535,338 | 7/1996 | Krause et al. | 395/200.52 |
| 5,546,453 | 8/1996 | Hebert | 379/242 |

*Primary Examiner*—Thomas C. Lee
*Assistant Examiner*—David Ton
*Attorney, Agent, or Firm*—Pedro P. Hernandez

[57] ABSTRACT

Multiplexer (100) includes a plurality of resident network management protocol handlers (116, 118 and 120). The multiplexer user can select which one of the protocols to use from among the resident protocols to use for framing network management messages received or transmitted via network management port (134). This selection can be made without requiring new hardware or software modules to be installed, and without significant run-time overhead to select among several supported protocols. Upon receiving a request to update the currently used protocol handler (116, 118 and 120) a handler index (124) which is used to select a pointer to all of the resident protocols, causes the newly selected to be activated, and any new network protocol messages are transmitted and received using the standards for the new protocol.

12 Claims, 4 Drawing Sheets

PROTOCOL SELECTION
LCD PANEL
ROM
CONTROLLER
DATA SWITCH
T1 FRAMERS
RAM
(MESSAGE FRAMED PER REQUIREMENTS OF THE ACTIVE PROTOCOL)
T7 HANDLER
PPP HANDLER
SLIP HANDLER
REAL-TIME PROTOCOL SWITCH
UART HANDLERS
HANDLER INDEX
HANDLER 1 ADDRESS
HANDLER n ADDRESS
HANDLER m ADDRESS
UART
UART
UART
100
102
104
106
108
110
112
114
116
118
120
122
124
126
128
132
134
136
138
140
142
144
148
150
152

208
INCOMING INFORMATION FLOW
202
PROTOCOL HANDLER
PROTOCOL DRIVERS' RECEIVE HANDLER ADDRESSES
PROTOCOL 1
PROTOCOL 2
PROTOCOL 3
PROTOCOL 4
ETC....
206
124
HANDLER INDEX
204
PROTOCOL DRIVERS' TRANSMIT HANDLER ADDRESSES
PROTOCOL 1
PROTOCOL 2
PROTOCOL 3
PROTOCOL 4
ETC....
210
PROTOCOL HANDLER
212
OUTGOING INFORMATION FLOW

SYSTEM FOR SELECTING NETWORK MANAGEMENT PROTOCOL BY SETTING PROTOCOL HANDLER INDEX BASED ON NEWLY SELECTED PROTOCOL AND SELECTING PROTOCOL HANDLER ADDRESS USING PROTOCOL HANDLER INDEX

FIELD OF THE INVENTION

This invention relates in general to the field of data communications, more particularly, this invention relates to an apparatus and method for selecting a particular network management protocol from among a plurality of resident network management protocols.

BACKGROUND OF THE INVENTION

Given the many different network management protocols in use today (e.g., SNMP, OSI systems management, etc.), it is difficult for data communication product manufacturers to provide data communication products that can support all of the available network management protocols. Some data communication product vendors will typically sell products which support a specific data management protocol, while some vendors may sell products which may support multiple protocols.

For data communication products which may support multiple protocols, several prior art approaches have been employed to select from amongst the available protocols. One approach is to use different hardware interface ports for each supported protocol. This approach however requires higher hardware costs and requires a person to manually change the hardware connections in the device in order to reconfigure the device to use the different interface port for the newly selected network management protocol. A second approach is to recompile and/or relink the communications software in the device in order to change protocol. This approach also has several disadvantages in that typically a technician needs to load the new software into the device which is time consuming and costly. A third approach is the use of a series of "IF" (or "case") conditional statements in software to select the active protocol from among the supported protocols at run-time. This approach has the drawback of increasing execution time as the number of supported protocols increases. Since for character oriented input/output (I/O), this decision must be made for every character, the added overhead can be significant.

A need thus exists in the art for a method and apparatus which can overcome the problems associated with the prior art mentioned above.

SUMMARY OF THE INVENTION

Figure 1:
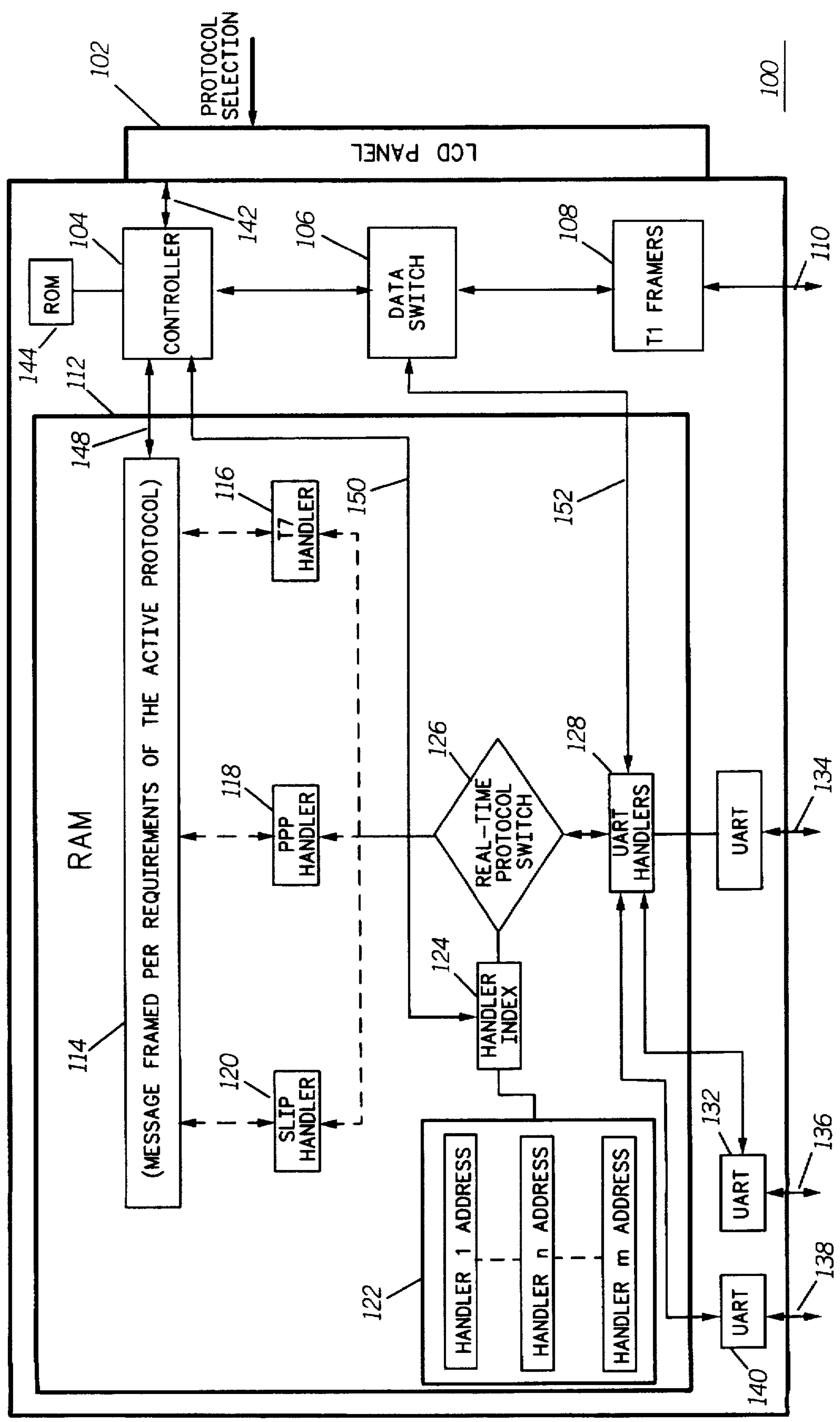
FIG. 1 shows a functional block diagram of a communication device in accordance with the present invention.

Briefly, according to the invention, a communication device includes at least two resident communication protocols used for exchanging network management information to and from the communication device. The communication device also includes a protocol index which becomes updated anytime the communication device user changes the currently selected communication protocol. The protocol index once updated, addresses the newly selected communication protocol such that the newly selected communication protocol is thereafter used to format incoming or outgoing network management information. The invention also provides for a method of selecting a communication protocol from among a plurality of communication protocols. Detailed description of the Preferred Embodiment Referring now to the drawings and in particular to FIG. 1, there is shown a simplified functional block diagram of a communication device such as a high speed digital access multiplexer 100. In the preferred embodiment, the communication device 100 comprises a network managed Excalibur® ISX 5300 digital access multiplexer manufactured by Racal-Datacom, Inc. The multiplexer 100 is a digital access product designed to transport local area network (LAN), PBX, voice and other data applications over a single (full or fractional) T-1 link.

The communication device 100 includes a user control 102 comprising a front panel having a liquid-crystal display (LCD) and numerous user input controls for interacting with the multiplexer 100. The multiplexer 100 can be configured via the front panel via control 102 or the device can be configured locally or remotely using a network management system via network management port 134. When managed by a local or remote network management system, alarms and events can be reported as Simple Network Management Protocol (SNMP) traps to any SNMP manager.

Information is transferred between the front panel 102 and controller 104 via bus 142. Controller 104 can comprise any one of a number of microprocessors or microcontrollers known in the art. In the preferred embodiment, controller 104 comprises a 68360 controller manufactured by Motorola, Inc. Controller 104 provides operational control of multiplexer 100 and executes the operational programs as well as the various resident communication protocol algorithms (handlers) found in multiplexer 100 that are used to transfer the network management information. The front panel 102 allows for a user to change the presently selected protocol (e.g., SLIP, PPP, T7, etc.) as well as to monitor and test the operation of the multiplexer 100.

The multiplexer 100 includes a network management interface port 134, which allows for the multiplexer 100 to communicate with local or remote network management devices which can locally or remotely manage the device's operation as well as test the device. Also included are a plurality of user data terminal equipment ports (DTE ports) 136 and 138 which allow for the interfacing of multiple user equipment (e.g., video sources, PBX, LAN bridge/routers, etc.) to the multiplexer 100. The data received via DTE ports 136 and 138 are then multiplexed and transmitted via T-1 port 110 as either a full or fractional T-1 data stream. Prior to the user data which is received at DTE ports 136 and 138 being transmitted as a T1 data stream, conventional data switch and T1 framing circuits 106 and 108 provide proper data formatting and framing. Block 106 is implemented using a conventional programmable gate array that controls the routing of all data that passes between external interfaces and the controller 104. Block 108 provides conventional Ti framing and formatting per the T1.403 and ANSI 54016 standards. Information which is received at user data terminal equipment ports (DTE ports) 136 and 138 is sent via bus 152 to data switch 106 for multiplexing.

Multiplexer 100 can also operate as a digital access and cross-connect system (DACS) for "groom and fill" functionality. Separate applications with under-utilized bandwidth such as PBX, channel bank, video and LAN can be routed via ports 136 and 138 to one T-1 circuit via port 110. Multiplexer 100 thereby eliminates the need for separate fractional T-1 circuits. Since the multiplexer 100 includes an integral DSU/CSU (not shown), the device can be directly connected to the T-1 line via port 110, eliminating the need for other external equipment.

Coupled to the DTE ports 136 and 138 are several universal asynchronous receiver/transmitter (UART) circuits 132 and 140, respectively. While coupled to the network management interface port 134 is another UART 130. The UART circuits 130, 132 and 140 provide proper line interfacing between the external equipment and multiplexer 100. While conventional UART handler routines 128 provide proper interfacing between UARTs 130, 132 and 140 and controller 104.

Controller 104 is coupled to a memory storage section, preferably comprising a random access memory (RAM) section 112, although other types of memory types as known in the art can also be utilized (e.g., EEPROM, etc.). Once the multiplexer 100 is booted-up, the three resident transport protocols and two network management protocols are loaded from non-volatile read-only memory (ROM) 144 into random-access memory (RAM) section 112. SNMP and T7 are network management protocols, while SLIP, PPP and T7 are link level (OSI layer 2) protocols. At the time the T7 protocol was developed there was no separation between transport and network management protocol layers and therefore here it is considered both, since it performs both functions. These communication protocols include the SLIP handler 120, the PPP handler 118, and the T7 handler 116. SLIP stands for Serial Line Internet Protocol and is a standard specified by the Internet Engineering Task Force (IETF) and is used to transfer IP datagrams using serial lines. PPP stands for Point-To-Point Protocol and is also a standard specified by IETF and, like SLIP, is used to transfer IP datagrams using serial lines. Finally, the T7 legacy protocol is a proprietary network management protocol developed by Racal-Datacom, Inc.

The present invention allows for changing of the network management protocol which is currently being used by multiplexer 100 for transmitting and receiving messages via port 134 without having to change hardware, or install new software as done by the prior art. The invention allows for different protocols that use the same physical media and interface connector (i.e., network management port 134) to be selected dynamically. Also, the invention does not affect the time required to process incoming and outgoing communications as the number of supported protocols increase, as would be the case if a series of tests (e.g., "if" statements) where added to the device's communications software that would compare the current protocol for a port to each of the supported protocols.

Preferably, each protocol handler 116, 118 and 120 is associated with a pair of arrays one for transmit and one for receive. Each different protocol handler algorithm includes a transmit and receive handler function. The handler addresses, shown in block 122, of these routines are placed into their respective arrays and referenced by a single handler (protocol) index 124. The handler index 124 selects the proper protocol handler 116, 118 or 120 to use when sending or receiving network management information via network management port 134.

Once the appropriate protocol has been selected by the handler index 124, any information which is received or transmitted via the network management port 134 is formatted using the formatting convention of the selected protocol (e.g., SLIP, PPP, T7, etc.) as shown by block 114. Properly formatted network management data is then acted by controller 104 via bus 148.

Figure 2:
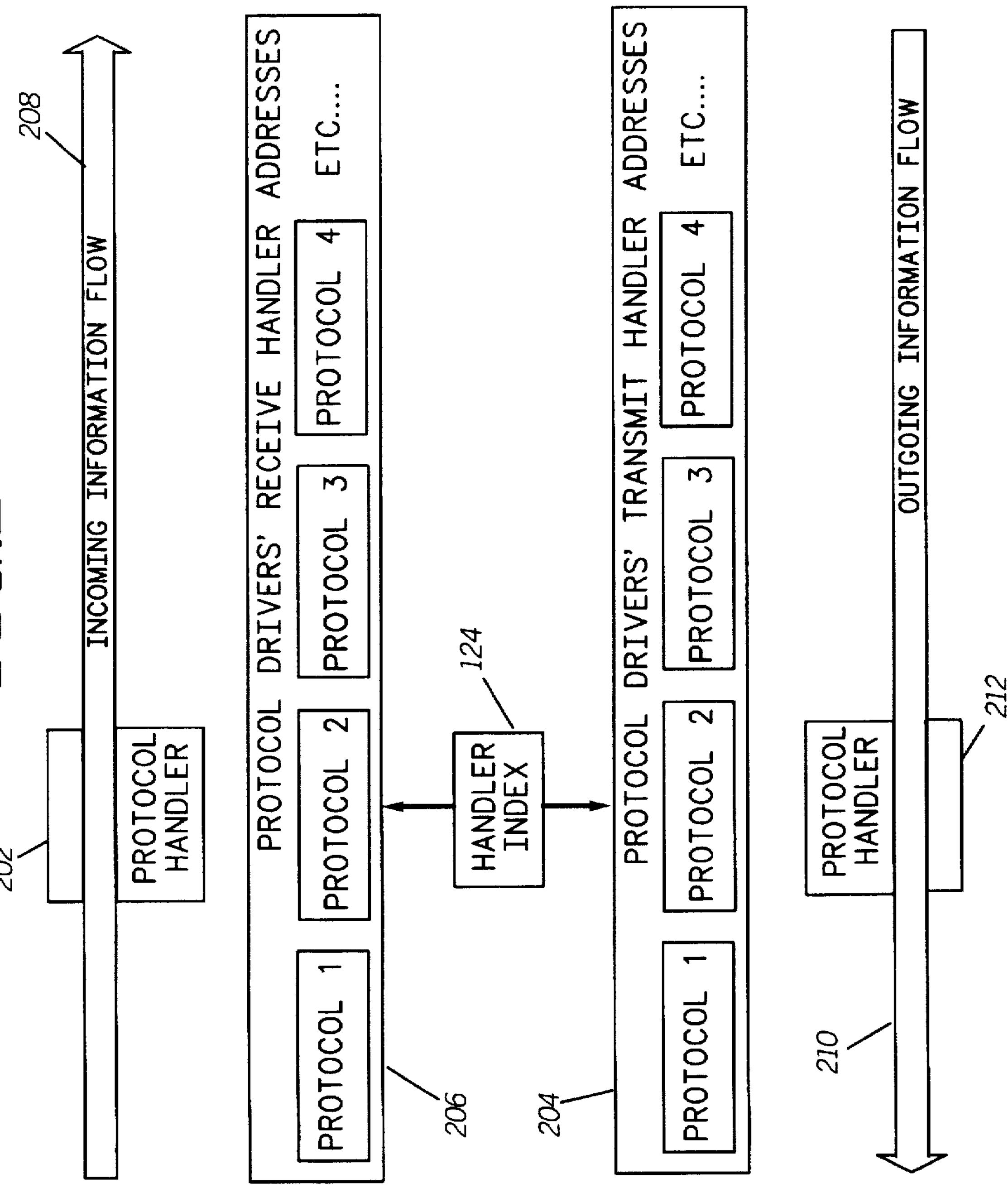
FIG. 2 shows a functional block diagram of how protocols are selected in accordance with the invention.

FIG. 2 shows a diagram which highlights the use of handler index 124 for both information 208 which is being received at network management port 134 (incoming information flow) and information transmitted 210 via the network management port 134 (outgoing information flow). As shown, the handler index 124 will point to entries in both transmit and receive address arrays 204 and 206 for the currently selected protocol. The transmit handler array 204 includes the transmit handler addresses for all of the resident protocols. In the preferred embodiment this would include the transmit handler addresses for the SLIP, PPP and T7 protocols. Correspondingly, the receive handler array 206 includes the receive handler addresses for all of the resident protocols.

When the currently selected network management protocol, in FIG. 2 it is shown as protocol 2, is changed via the device's front panel 102, or remotely, via the network management port 134, the handler index 124 which points to the protocol handler arrays., is updated to point to the receive and transmit handlers for the newly selected protocol (e.g., protocol 3). This causes the presently selected receive 202 and transmit protocol handlers 212 which are operating on incoming and outgoing network management information to change. Once updated, the handler index 124 causes received information to be formatted according to the newly selected receive protocol handler (e.g., protocol 3), and transmitted information to be transmitted via the network management port 134 is formatted using the formatting convention of the selected protocol (e.g., SLIP, PPP, T7, etc.) as shown by block 114. Properly formatted network management data is then acted by controller 104 via bus 148.

FIG. 2 shows a diagram which highlights the use of handler index 124 for both information 208 which is being received at network management port 134 (incoming information flow) and information transmitted 210 via the network management port 134 (outgoing information flow). As shown, the handler index 124 will point to entries in both transmit and receive address arrays 204 and 206 for the currently selected protocol. The transmit handler array 204 includes the transmit handler addresses for all of the resident protocols. In the preferred embodiment this would include the transmit handler addresses for the SLIP, PPP and T7 protocols. Correspondingly, the receive handler array 206 includes the receive handler addresses for all of the resident protocols.

When the currently selected network management protocol, in FIG. 2 it is shown as protocol 2, is changed via the device's front panel 102, or remotely, via the network management port 134, the handler index 124 which points to the protocol handler arrays, is updated to point to the receive and transmit handlers for the newly selected protocol (e.g., protocol 3). This causes the presently selected receive 202 and transmit protocol handlers 212 which are operating on incoming and outgoing network management information to change. Once updated, the handler index 124 causes received information to be formatted according to the newly selected receive protocol handler (e.g., protocol 3), and transmitted information to be handled by the newly selected transmit protocol handler routine.

Referring back to FIG. 1, once the user requests a protocol change by activating a control switch on the front panel 102, an information signal is sent to controller 104 via bus 142. Controller 104 in response to the information signal adjusts the handler index 124 by sending a control message via line 150 to RAM 112. This control message causes the handler index 124 to become updated and point to the new handler addresses for the newly selected protocol. For protocol changes which are performed by a local or remote network management system, a change of protocol request is received at network management port 134. Once received, the protocol change request is sent to controller 104 via bus 148. Controller 104 then updates handler index 124 via bus 150, which causes the handler addresses to become updated.

With the present invention, the time required to invoked a protocol's handler does not depend on the number of entries in the array, as would be the case if a number of conditional statements (i.e., "if" statements, etc.) were used to decide on which handler to use. The invention thereby avoids having to test which protocol is active every time data is read to determine how to process the data. Hence, additional protocols can be added to the system without incurring any additional overhead in the interrupt service layer. Further, the expense (i.e., execution time) required to change protocols is simply the overhead associated with simple arithmetic operations on the index.

When network management messages are received at port 134, they are passed through UART 130 and UART handler 128 which provide the physical level interface to the external devices. The messages are then sent to the presently selected network management protocol 116, 118 or 120. This routing of incoming messages to the selected protocol is shown functionally by way of real-time protocol switch 126 in FIG. 1. In practice, however, the linking of the appropriate protocol 116, 118 or 120 is done by the selection of the appropriate software routine which is selected by handler index 124 which points to an entry in an array of addresses of the appropriate transmit and receive handler routines.

Although the preferred embodiment does not support the changing of communication protocols within multiplexer 100 remotely, one could design multiplexer 100 to allow for such remote protocol updating. In order to switch protocols remotely via the network management port 134, a remote network management system (not shown) would send a change protocol message to multiplexer 100 via port 134. The message would then be sent to controller 104 which would act on the message and update the protocol handler index accordingly. All three protocols supported by multiplexer 100 require different lowest level transmit and receive software. In the preferred embodiment, the transmit and receive routines are implemented as interrupt service routines called from a central interrupt handler dedicated to servicing the UART 130 which is assigned to network management functions.

Figure 3:
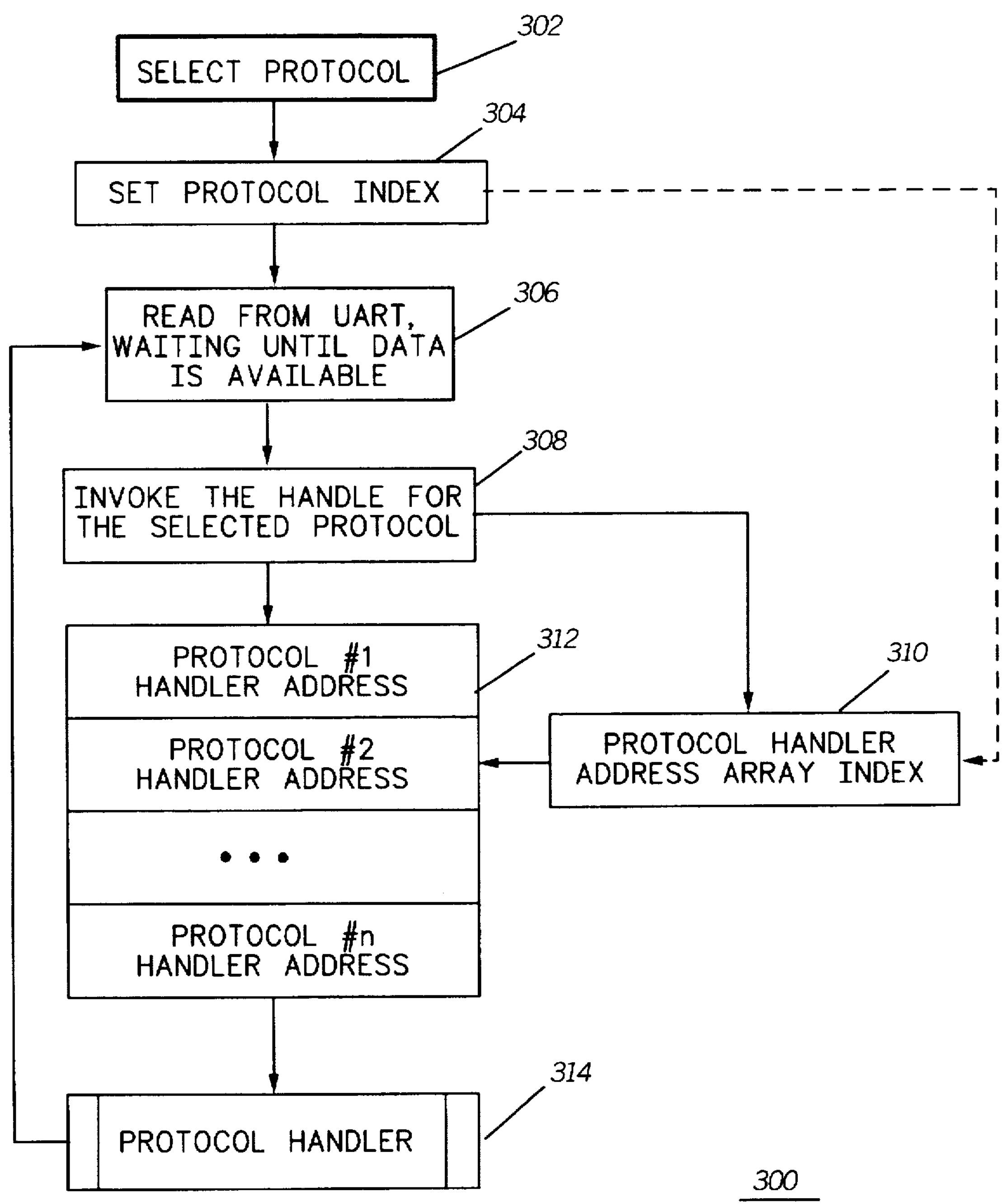
FIG. 3 shows a flowchart of the steps taken for selecting a new network management protocol according to the present invention.

Referring now to FIG. 3, there is shown a flowchart of the central interrupt handler routine. Once controller 104 determines that a request for a new network management protocol has been requested by either activation of a control switch on front panel 102 or remotely via network management port 134, the select protocol routine 302 moves to step 304. In step 304, the protocol handler index 124 is updated to reflect the newly selected protocol. This in turn causes the protocol handler index 124 to point to the appropriate handler address in step 310. In step 306, controller 104 determines if data is available from the network management port 134. If incoming data has been received, in step 308 the controller 104 invokes the appropriate protocol handler for the appropriate handler. Since the handler index 124 is already pointing to the selected handler array in step 310, the appropriate handler address is selected in step 312. In step 314, the appropriate handler is used to format the incoming data, this block is discussed in detail with reference to FIG. 4 The routine then returns to step 306 waiting for more incoming data to be received.

Figure 4:
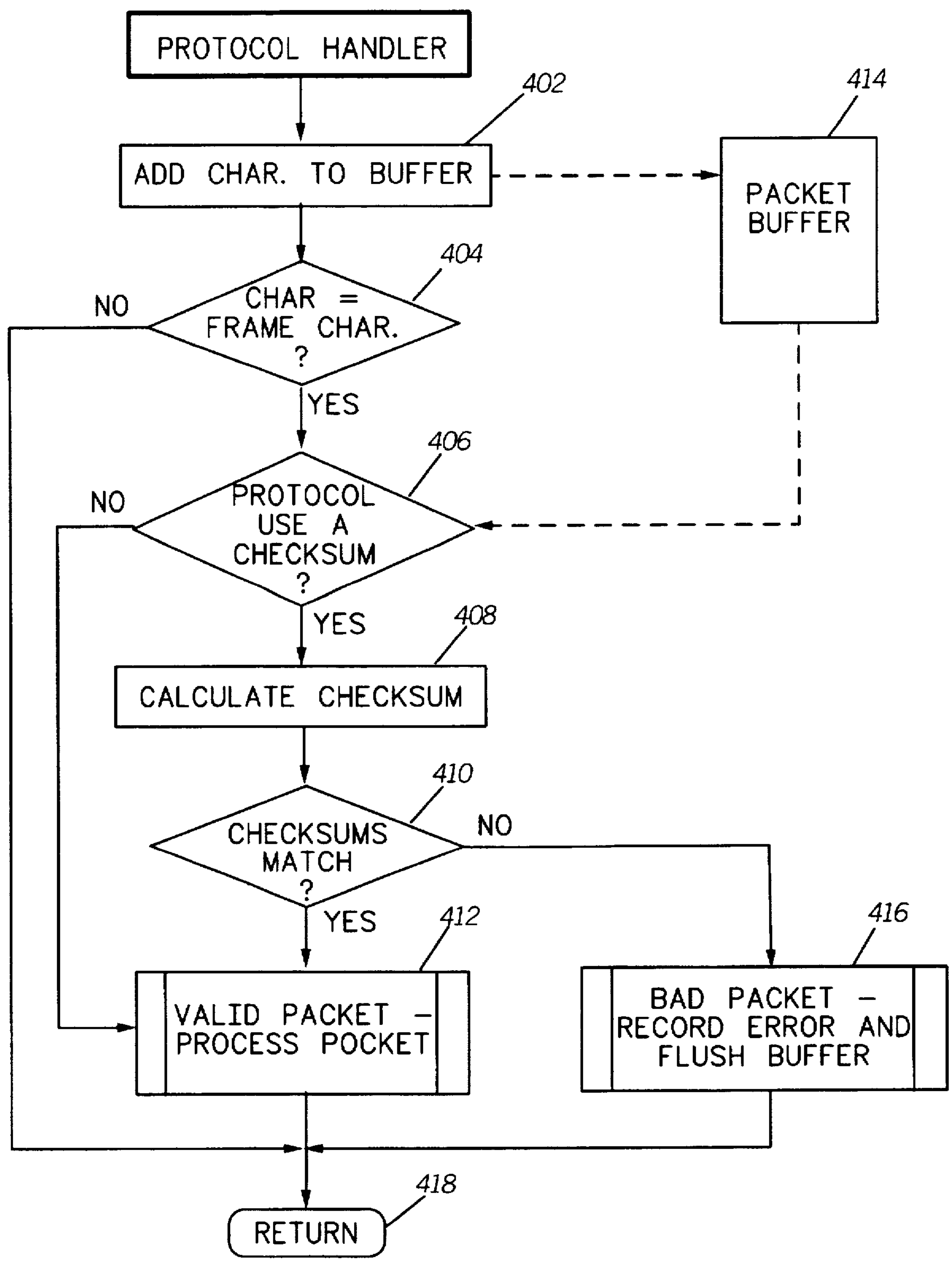
FIG. 4 is a continuation of FIG. 3.

A more detailed look at the typical operation of the protocol handlers is shown in FIG. 4. Once a character is received at network management port 134, the character is placed in a temporary buffer located in RAM 112, in step 402. As new characters are received they are stored in the packet buffer as shown by the dashed data flow lines from step 402 to step 414. Once the complete packet buffer is received, as indicated by the reception of the appropriate end-of-message (EOM) framing character, the packet is ready to be checked for errors.

In step 404, it is determined if the character that was stored in step 402 is a frame character signifying the end of a packet. If the character received is not a frame character, the routine goes to step 418 and then back to step 306. If the character received in step 404 is a frame character, in step 406, it is then determined if the selected protocol performs checksums. If checksums are used by the currently selected protocol, in step 408 a checksum of the received data is performed. If the checksums match, indicating that the data does not have any errors, the process moves to a conventional routine which processes the valid data packet in step 412. Valid packet-process routine 412 provides the properly formatted information to controller 104. Controller 104 then acts on the received information accordingly. For example, the received information may be requesting network management information from controller 104 or may be asking controller 104 to place multiplexer 100 in a test mode (i.e., loop-back mode, etc.).

If in step 410 the checksums do not match, the fact that a bad packet (packet containing an error) was received is recorded for future network management statistics by controller 104 and the packet buffer is cleared by the routine shown in block 416. If it is determined that the currently selected protocol does not utilize checksums in step 406, the routine goes from step 406 to step 412. Once finished with either routine 412 or routine 416, the routine goes to step 418 which causes the protocol handler routine to be exited and the process moves back to step 306.

While the invention has been described in conjunction with specific embodiments, it is evident that many alternatives, modifications, permutations and variations will become apparent to those skilled in the art in light of the foregoing description. For example, although in the present invention the preferred embodiment is a multiplexer, other communication devices such as routers, bridges, etc. can utilize the present invention. As well, other implementations can utilize different and/or more protocols than those described in the preferred embodiment.

As discussed above, the present invention avoids the expense of having to change hardware modules, or having to download new software when changing network management protocols. The present invention also avoids having to test which protocol is active every time data is read from the UART to determine how to process the incoming network management data as would be the case when using a series of conditional statements.

What is claimed is:

1. A method for selecting a communication protocol from among a plurality of communication protocols residing in a communication device, one of said plurality of communication protocols being the presently selected communication protocol, the communication protocols are used for transferring network management information to and from the communication device, the method comprising the steps of:

(a) receiving a request at the communication device to change the presently selected network management communication protocol used to a new network management communication protocol selected from among the plurality of network management communication protocols residing in the communication device;

(b) setting a protocol handler index based on the new network management communication protocol requested in step and (c) selecting a protocol handler address which corresponds to the newly selected network management communication protocol using the protocol handler index set in step (b).

2. A method as defined in claim 1, wherein each of the plurality of network management communication protocols residing in the communication device include a receive protocol handler address and a transmit handler address and the protocol handler index in step (c) selects both the receive protocol handler address and the transmit protocol handler address corresponding to the newly selected network management communication protocol.

3. A method as defined in claim 1, further comprising the step of:

(d) using the newly selected network management communication protocol to format network management information that is received or transmitted by the communication device.

4. A method as defined in claim 1, wherein the request received in step (a) is sent by a remotely located network management system.

5. A method as defined in claim 1, wherein the request received in step (a) is generated by activating a control switch located in the communication device.

6. A communication device, comprising:

a port for receiving and transmitting network management information;

a controller coupled to the port;

a memory section coupled to the controller and having stored therein at least two network management communication protocols used for transferring network management information via the port, one of said at least two network management communication protocols being the presently selected protocol, the memory section also having stored therein a protocol index used for selecting the at least two communication protocols; and the controller in response to receiving a signal requesting to change the presently selected network management communication protocol updates the protocol index so that it points to the newly selected network management communication protocol.

7. A communication device as defined in claim 6, further comprising:

a user control; and the signal requesting to change the presently selected network management communication protocol is generated by activating the user control.

8. A communication device as defined in claim 6, wherein the signal requesting to change the presently selected network management communication protocol is sent to the communication device via the port used for receiving and transmitting network management information.

9. A communication device as defined in claim 6, wherein the communication device comprises a digital access multiplexer.

10. A communication device as defined in claim 6, wherein each of the at least two network management communication protocols include both a receive handler address and a transmit handler address and the receive handler addresses for the at least two network management communication protocols are stored in the memory section as a first address array and the transmit handler addresses for the at least two network management communication protocols are stored in the memory section as a second address array.

11. A communication device as defined in claim 10, wherein the protocol index points to both the receive and transmit handler addresses located in the first and second address arrays which correspond to the newly selected network management communication protocol.

12. A communication device as defined in claim 8, wherein the signal requesting to change the presently selected network management communication protocol is sent to the communication device by a remotely located network management system.

* * * * *